(12) United States Patent
King et al.

(10) Patent No.: US 12,276,961 B2
(45) Date of Patent: Apr. 15, 2025

(54) WIRELESS CONTROL ASSEMBLY FOR CUTTING MACHINE

(71) Applicant: Team Industrial Services, Inc., Sugar Land, TX (US)

(72) Inventors: Mark King, Cumbria (GB); Jimi Wade, Cumbria (GB); Oliver Evans, Cumbria (GB)

(73) Assignee: Team Industrial Services, Inc., Sugar Land, TX (US)

( * ) Notice: Subject to any disclaimer, the term of this patent is extended or adjusted under 35 U.S.C. 154(b) by 28 days.

(21) Appl. No.: 18/036,324

(22) PCT Filed: Dec. 14, 2021

(86) PCT No.: PCT/US2021/063395
§ 371 (c)(1),
(2) Date: May 10, 2023

(87) PCT Pub. No.: WO2022/132824
PCT Pub. Date: Jun. 23, 2022

(65) Prior Publication Data
US 2024/0012380 A1 Jan. 11, 2024

Related U.S. Application Data

(60) Provisional application No. 63/125,624, filed on Dec. 15, 2020.

(51) Int. Cl.
*G05B 19/19* (2006.01)
*G05B 19/40* (2006.01)

(52) U.S. Cl.
CPC .... *G05B 19/40* (2013.01); *G05B 2219/31165* (2013.01); *G05B 2219/37358* (2013.01)

(58) Field of Classification Search
CPC .......... G05B 19/40; G05B 2219/31165; G05B 2219/37358; G05B 19/19; G05B 19/409; B23B 3/265
See application file for complete search history.

(56) References Cited

U.S. PATENT DOCUMENTS 9,868,182 B1 1/2018 Smith
2009/0215598 A1 8/2009 Migliore et al.
(Continued)

OTHER PUBLICATIONS

International Search Report and Written Opinion in related application PCT/US2021/063395 dated Mar. 7, 2022.
(Continued)

*Primary Examiner* — Muhammad S Islam
(74) *Attorney, Agent, or Firm* — Patterson + Sheridan, LLP

(57) ABSTRACT

A technique provides for wireless control of a machine tool, e.g. a portable machine tool used on-site. According to an embodiment, a motor is connected with a tool post assembly via a gearbox. The motor is coupled with a machine controller, and the tool post assembly is mounted proximate an object to be machined. For example, the object may be machined via a cutting tool mounted to a cutter post of the tool post assembly. The machine controller operates to control movement of the cutter post along a desired axis during the cutting operation. The machine controller and thus the cutting operation, however, are controlled wirelessly according to control instructions provided via a control device, e.g. a handheld control device, which is placed in wireless communication with the machine controller.

20 Claims, 8 Drawing Sheets

(56) References Cited

U.S. PATENT DOCUMENTS

| | | |
|---|---|---|
| 2014/0069254 A1 | 3/2014 | Katzenberger et al. |
| 2015/0151363 A1 | 6/2015 | Backhouse et al. |
| 2016/0288214 A1 | 10/2016 | Ishihara |
| 2016/0303696 A1 | 10/2016 | Choi |
| 2020/0114436 A1* | 4/2020 | Song .................. B23C 3/13 |

OTHER PUBLICATIONS

Office Action in related application EP 21907664.3 dated Feb. 14, 2025.

* cited by examiner

WIRELESS CONTROL ASSEMBLY FOR CUTTING MACHINE

CROSS-REFERENCE TO RELATED APPLICATION

The present document is based on and claims priority to U.S. Provisional Application Ser. No. 63/125,624, filed Dec. 15, 2020, which is incorporated herein by reference in its entirety.

FIELD OF DISCLOSURE

In general, the disclosure describes a control system by which a machine tool, e.g. a cutting tool, is controllable via a wireless control assembly. The wireless control assembly enables remote control of a rotational output and may be used to control the feed of a machine tool along a selected axis.

BACKGROUND OF DISCLOSURE

Various machining operations are relatively straightforward when carried out off-site and within a machine shop facility. An example of such a machining operation is flange refacing which is a process by which damaged or corroded steel flange surfaces are re-cut using lathe technology so that a flange surface may be brought back to an "as new" standard. However, such flange refacing operations and other machining operations are much more challenging when the components being machined remain on-site and connected to existing pipework or other infrastructure. A range of portable machines are available for a variety of cutting operations. When operating such portable machines, however, an operator often must reach into the machine while it is rotating to provide inputs, e.g. to adjust toolpost axial feed, and this manual interaction results in risk to the operator.

What is needed is a wireless control assembly which eliminates the direct interaction of an operator with the machine while it is rotating or otherwise operating.

SUMMARY

This summary is provided to introduce a selection of concepts that are further described below in the detailed description. However, many modifications are possible without materially departing from the teachings of this disclosure. Accordingly, such modifications are intended to be included within the scope of this disclosure as defined in the claims. This summary is not intended to identify key or essential features of the claimed subject matter, nor is it intended to be used as an aid in limiting the scope of the claimed subject matter.

According to an embodiment, a system and methodology are provided for enabling wireless control of a machine tool, e.g. a portable machine tool used on-site. By way of example, a motor, e.g. a stepper motor, is connected with a tool post assembly via a gearbox. The motor is coupled with a machine controller, and the tool post assembly is mounted proximate an object to be machined. For example, the object may be machined via a cutting tool mounted to a cutter post of the tool post assembly. The machine controller operates to control movement of the cutter post along a desired axis during the cutting operation. The machine controller and thus the cutting operation, however, are controlled wirelessly according to instructions provided via a control device, e.g. a handheld control device, which is placed in wireless communication with the machine controller.

BRIEF DESCRIPTION OF THE FIGURES

Certain embodiments of the disclosure will hereafter be described with reference to the accompanying drawings, wherein like reference numerals denote like elements. It is emphasized that, in accordance with standard practice in the industry, various features are not drawn to scale. In fact, the dimensions of various features may be arbitrarily increased or reduced for clarity of discussion. It should be understood, however, that the accompanying figures illustrate the various implementations described herein and are not meant to limit the scope of various technologies described herein, and.

DETAILED DESCRIPTION

Figure 1:
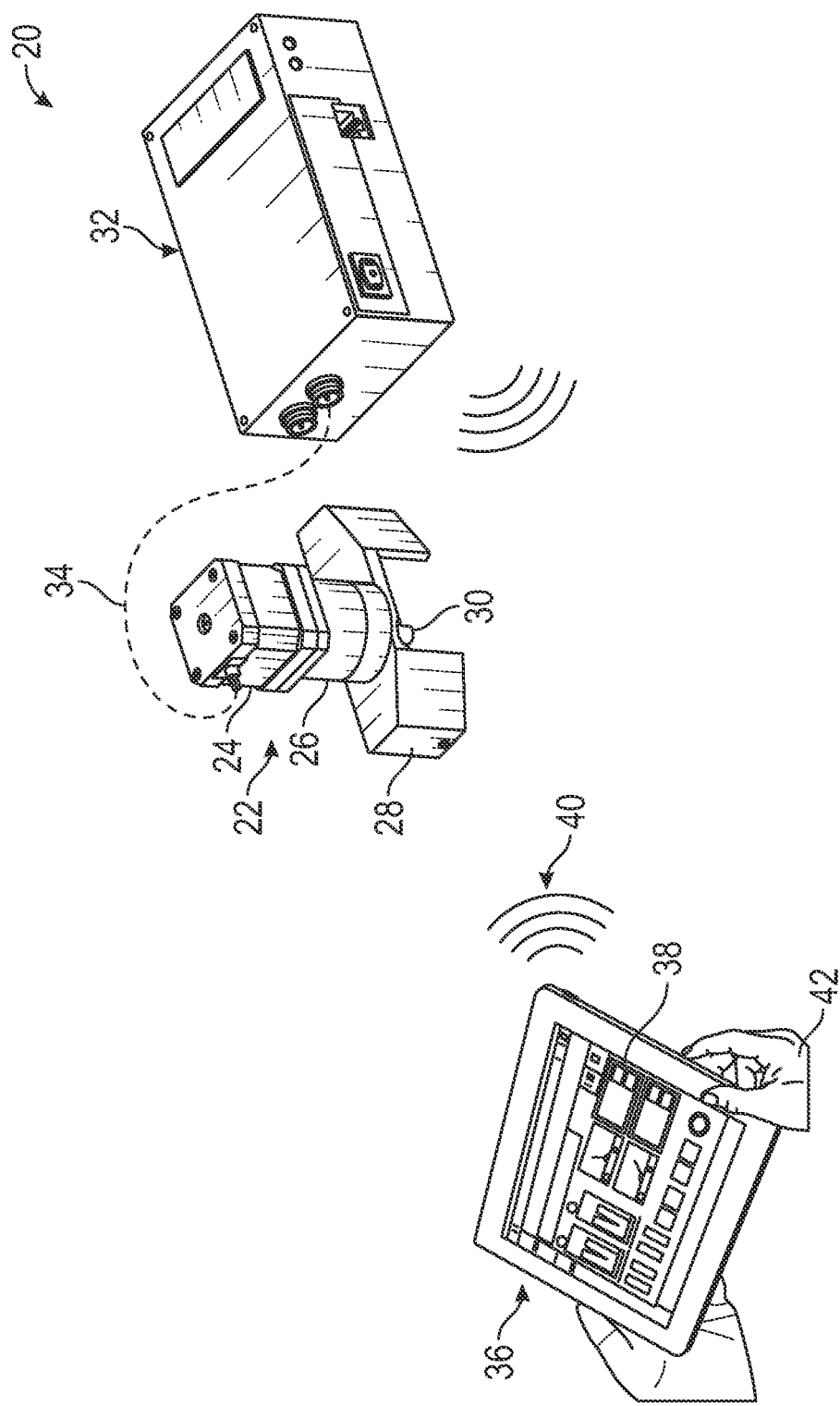
FIG. 1 is an illustration of an example of a wireless control system for use in controlling a machine in accordance with embodiments of the present disclosure.

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements.

The present disclosure generally relates to a system and methodology for providing wireless control of a machine tool, e.g. a portable machine tool used on-site. According to an embodiment, a motor, e.g. a stepper motor, is connected with a tool post assembly which is used to control the movement of a tool, e.g. a cutting tool, along at least one axis. The motor may be connected with the tool post assembly via a gearbox. Additionally, the motor is coupled with a machine controller, and the tool post assembly is mounted proximate an object to be machined.

For example, the object may be machined via a cutting tool mounted to a cutter post of the tool post assembly. One type of application may involve the refacing of a flange associated with a pipe or other structure. The machine controller operates to control movement of the cutter post along a desired axis during the cutting operation. In some applications, the machine controller may be operated to control cutting depth along a linear cutting depth axis. The machine controller and thus the cutting operation, however, are controlled wirelessly according to control instructions provided via a control device, e.g. a handheld control device, which is placed in wireless communication with the machine controller. For example, an operator may provide control instructions to the handheld control device via a graphical user interface. Those control instructions may then be wirelessly relayed to the machine controller which, in turn, controls operation of the tool post assembly/cutting tool according to the inputs provided. Accordingly, an operator may control the feed along a given axis or provide other machining controls without physically interacting with the tool post assembly or cutting tool during the cutting operation.

The control scheme may be used for a variety of remote machine controls. For example, the control system may be used for indexing of a rotational output which may be used to control the feed along an axis of the machine tool. By implementing the wireless technology, an operator is able to remotely control machine output without the need for wired connections or interaction between man and machine while the machine is rotating or otherwise operating. The control system also may be used to enable system monitoring and interaction of safety protocols in the event of a signal loss. If the tool post assembly is used on-site with a lathe type cutter for refacing flanges, the flange being operated on may be held static while the lathe rotates within or outside the flange. However, the wireless system enables cut depth controls to be sent to the machine controller, thus allowing an operator to remain at a distance while controlling the cutting operation.

Referring generally to FIG. 1, an embodiment of a wireless control system 20 is illustrated. In this example, the wireless control system 20 comprises a motive unit 22 having, for example, a motor 24 coupled to a gearbox 26 secured to a mounting bracket 28. The motor 24 may be in the form of a stepper motor or other suitable motor providing a rotational output to gearbox 26 which, in turn, provides a rotational output via output shaft 30. A machine controller 32, e.g. a cut depth controller, is coupled with the stepper motor 24 (or other suitable motor) via a connection lead 34 which may be in the form of a cable or other suitable connection lead for transferring control commands from machine controller 32 to the motor 24.

However, control instructions may be provided to the machine controller 32 wirelessly from a handheld control device 36. By way of example, the handheld control device 36 may be in the form of a tablet, smart phone, or other remote, handheld computer type device. The handheld control device 36 comprises a mobile operator interface 38, such as a graphical user interface (GUI), by which an operator may enter commands/instructions and receive data. The commands/instructions are transferred from handheld control device 36 to machine controller 32 and data is received from machine controller 32 via a wireless transmission protocol 40. This enables an operator 42 to control motor 24 and to thus control a machining operation at a distance from the actual operation while also receiving pertinent data related to the machining operation.

Figure 2:
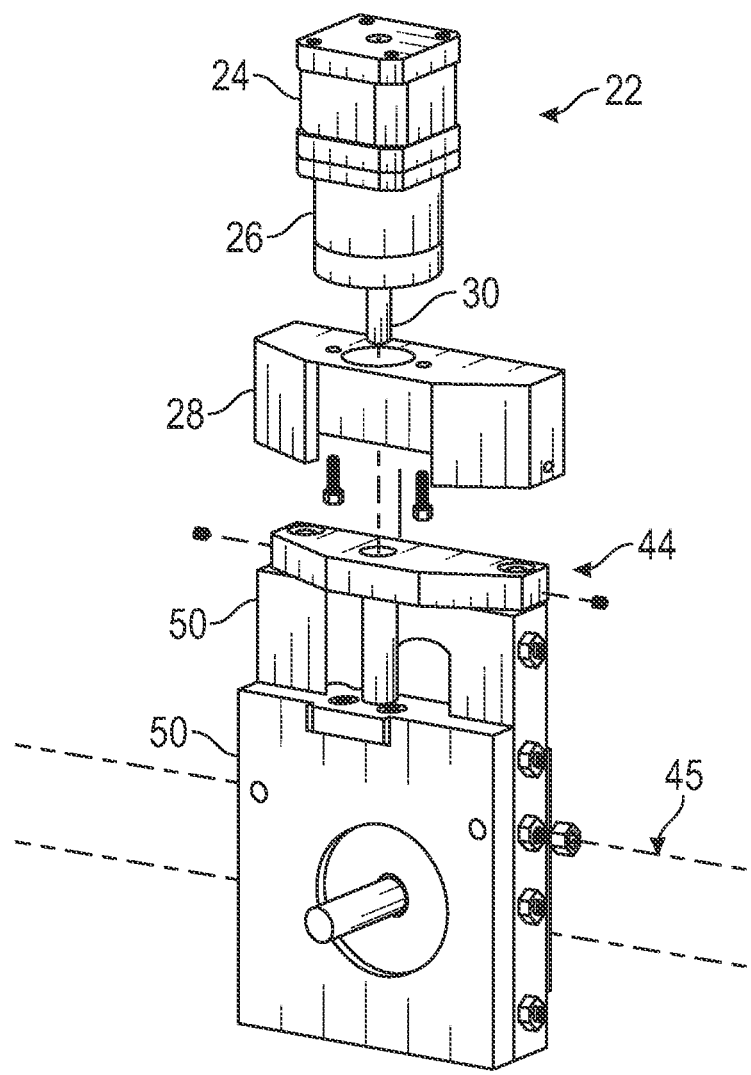
FIG. 2 is an exploded view of an example of a tool post assembly which may be coupled with a stepper motor via a gearbox and a mounting bracket in accordance with embodiments of the present disclosure.
Figure 3:
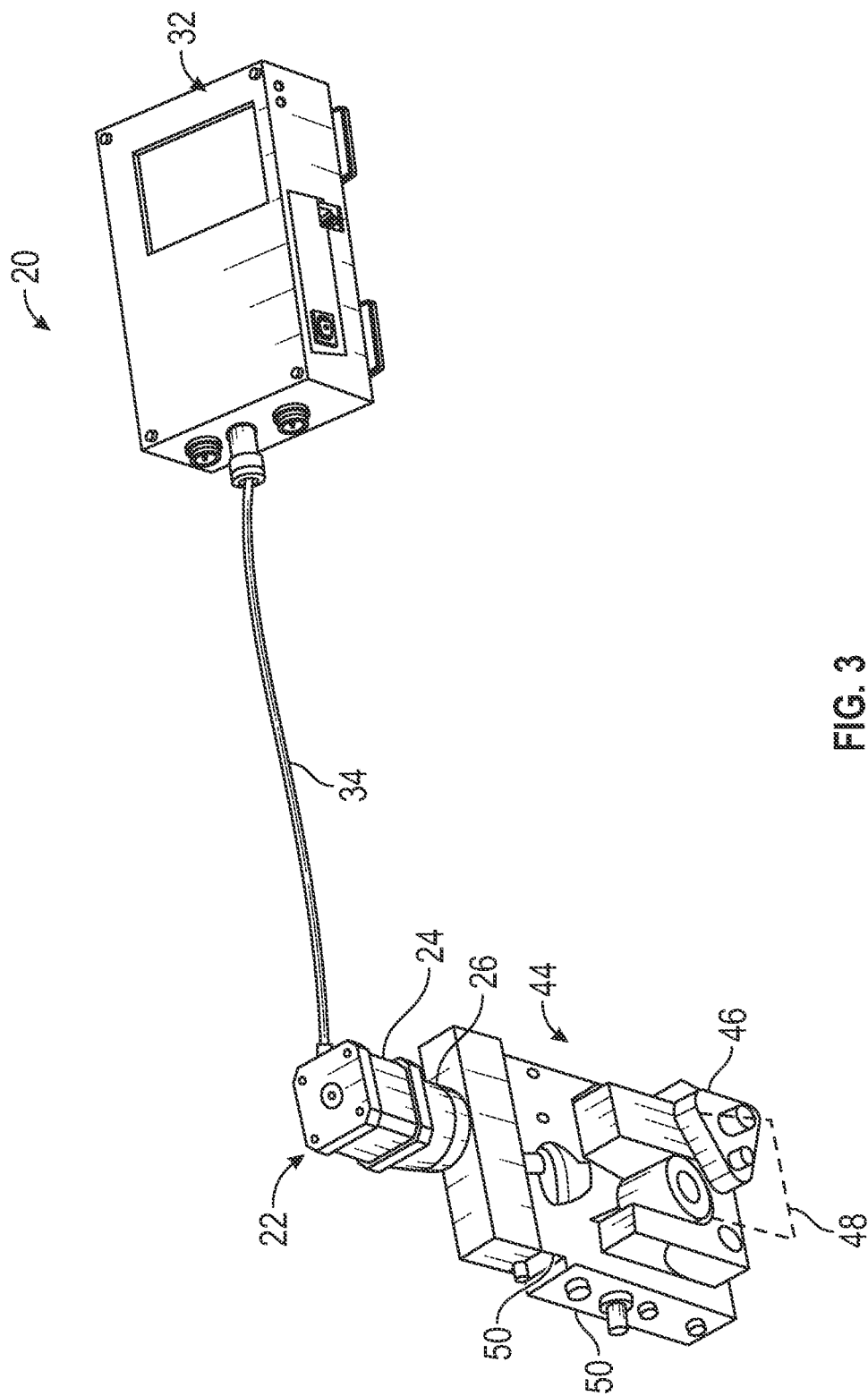
FIG. 3 is an orthogonal view of an example of a machine controller coupled with a stepper motor via a connection lead in accordance with embodiments of the present disclosure.

With additional reference to FIG. 2, the motor 24 may be connected to a tool post assembly 44 via the gearbox 26 and output shaft 30. By way of example, the motor 24 and gearbox 26 may be secured to the tool post assembly 44 by the appropriately configured mounting bracket 28. The tool post assembly 44 (along with motive unit 22) is readily movable to a desired location, e.g. a worksite location, and is mountable proximate an object 45, e.g. mountable directly to object 45, to be machined or otherwise operated on. As further illustrated in FIG. 3, the tool post assembly 44 may comprise a cutter post 46 on which an appropriate tool 48, e.g. a cutting tool, is mounted for controlled movement with respect to object 45 according to the operation of motor 24 and corresponding rotational output of shaft 30.

It should be noted the tool post assembly 44 may have a variety of configurations depending on the machining operation or other operation to be performed on object 45. For example, the tool post assembly 44 may have a variety of gears, shafts, and/or mounting brackets configured to accommodate the intended machining operation or other operation on object 45. In some machining operations, the tool post assembly 44 may have an output shaft/gear and appropriate mounting features for mounting and driving the tool post assembly 44 linearly along a supporting tool post structure. For other machining operations, the tool post assembly 44 may have cooperating components 50 (see FIG. 2) which enable mounting, positioning, and precisely controlled movement of tool 48 along a desired axis in response to operation of stepper motor 24. For example, controlled operation of stepper motor 24 may be used to precisely control movement of cutter post 46 and thus cutting tool 48 along a cutting axis, e.g. to precisely control cut depth. These are just a few examples of various tool post assembly configurations which may be constructed to enable a given, controllable machining operation.

According to a specific example, cutting tool 48 is in the form of a lathe and the tool post assembly 44 is constructed as a portable unit which may be mounted on or adjacent object which, in this example, is in the form of a metal flange in need of refacing. The cooperating components 50 may be in the form of components which can slide or shift relative to each other to enable control over the depth of cut based on inputs from stepper motor 44. The machine controller 32 provides signals to stepper motor 24 via connection lead 34 to precisely control the stepper motor 24 for achieving a desired depth of cut. However, an operator is able to select and adjust the control signals output by machine controller 32 according to instructions provided remotely via handheld device 36. These control instructions are sent wirelessly from handheld device 36 to the machine controller 32 which then converts them into appropriate control commands for stepper motor 24 so as to precisely control the depth of cut on the flange or other object 45.

Figure 4:
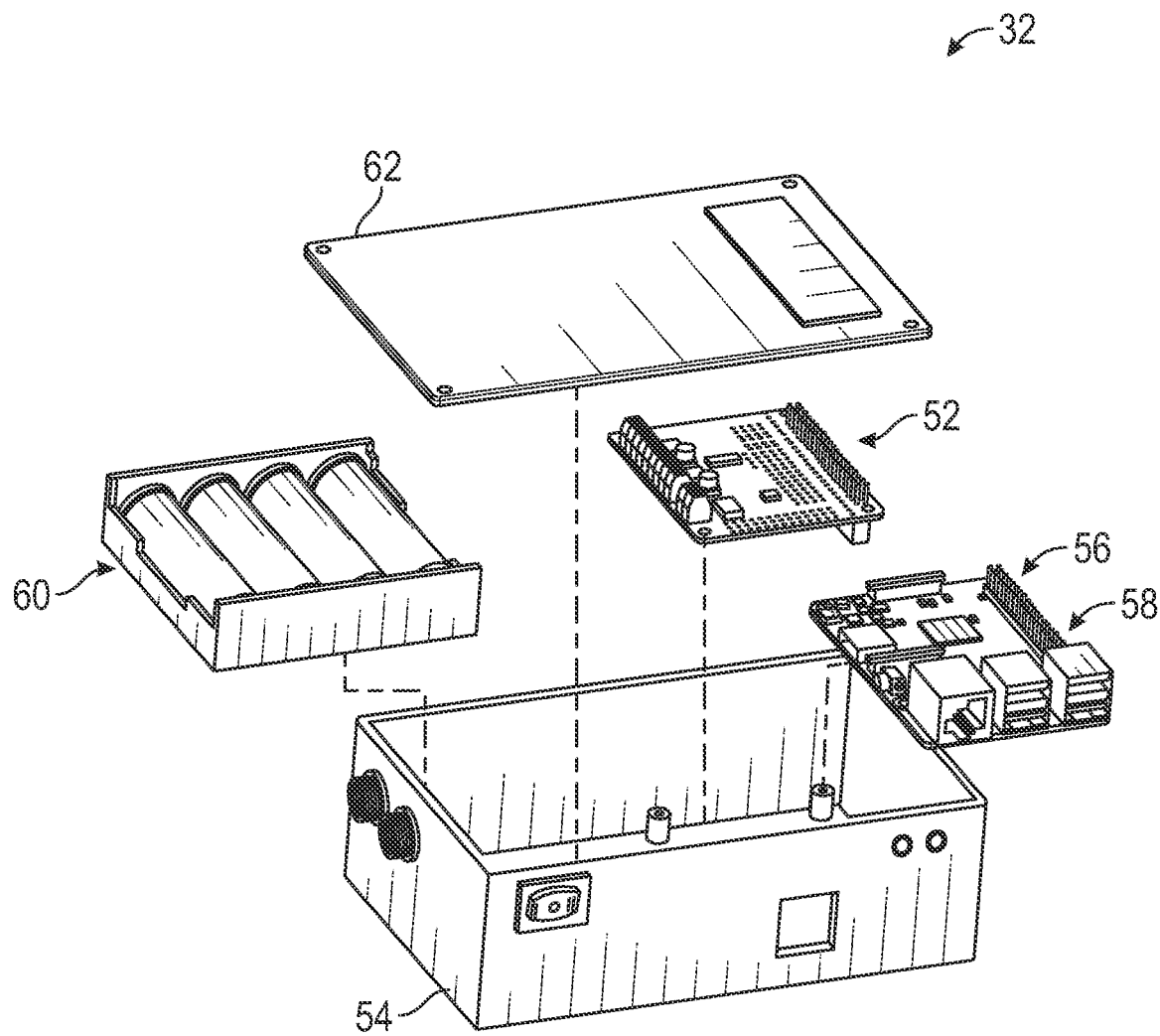
FIG. 4 is an exploded view of an example of a machine controller in accordance with embodiments of the present disclosure.

In FIG. 4, an exploded view is provided of one example of machine controller 32 which is able to wirelessly receive control commands/instructions from handheld device 36 and to wirelessly output data to the handheld device 36. In this example, machine controller 32 comprises a stepper motor controller 52 configured for providing the machine control commands to stepper motor 24. The stepper motor controller 52 may be mounted in a housing 54.

Additionally, the machine controller 32 comprises a microcontroller 56 having a wireless transceiver 58 able to receive the wireless commands/instructions from handheld device 36 and to output data to handheld device 36. The microcontroller 56 also is mounted within housing 54. In this example, the machine controller 32 also comprises a battery pack or other self-contained power source for powering controllers 52, 56. By way of example, the battery pack 60 may be a rechargeable battery pack which is also mounted within housing 54 and closed in via a suitable housing cover 62.

Depending on the specifics of the machining operation or other operation to be performed on object 45, the operator interface 38 and corresponding control software and wireless communication software may have a variety of configurations suitable for use on handheld device 36. In FIGS. 5-8, examples of functionality that may be provided via operator interface 38 are shown although many other types of graphical user interfaces and many other types of control functionality may be implemented.

Figure 5:
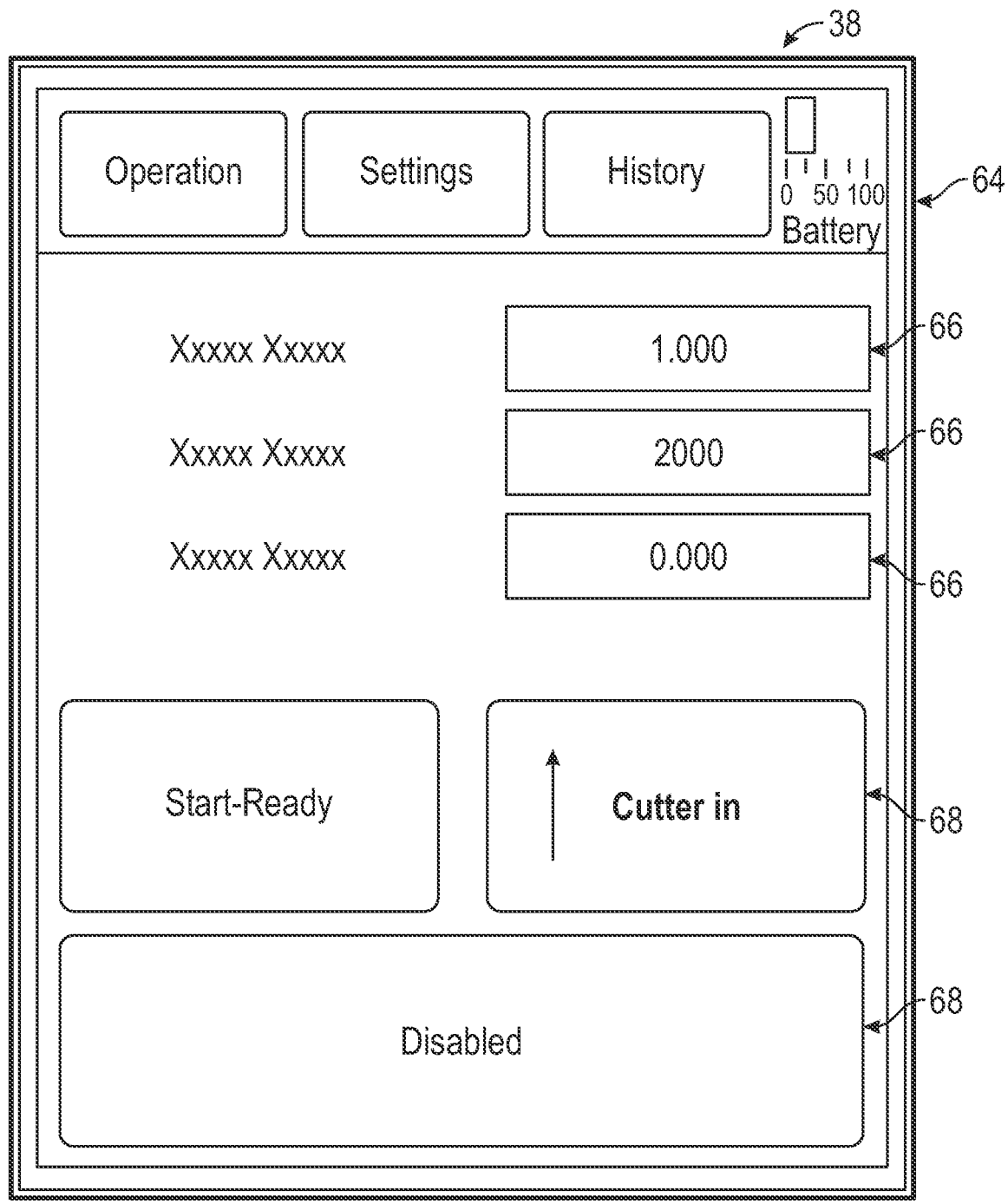
FIG. 5 is a schematic example of a graphical user interface which may be used on a handheld device for wirelessly providing instructions to the machine controller in accordance with embodiments of the present disclosure.

In the example illustrated in FIG. 5, the operator interface 38 provides a startup screen having a screen header 64 which may comprise screen navigation buttons and a battery status monitor. Additionally, the operator interface 38 provides data entry and display fields 66 through which control data may be entered, e.g. cut depth and other cutting related data. The illustrated operator interface 38 also comprises main control buttons 68. Examples of main control buttons 68 include a start button which initiates movement of the cutting tool 48; a cut tool direction button (e.g. cutting tool in or cutting tool out); and an enable/disable button for selectively enabling the machine controller 32.

Figure 6:
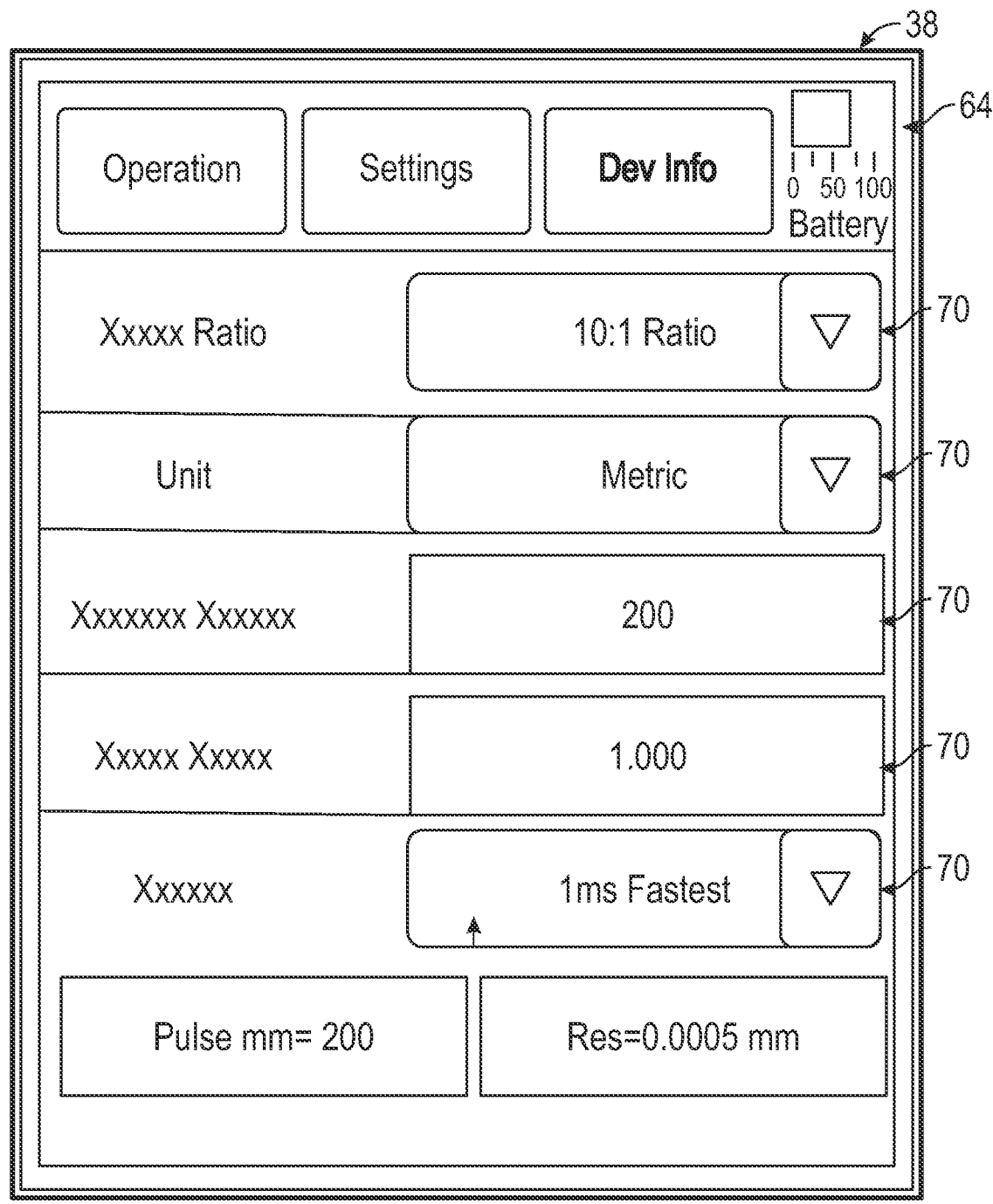
FIG. 6 is a schematic example of another screen of the graphical user interface in accordance with embodiments of the present disclosure.
Figure 7:
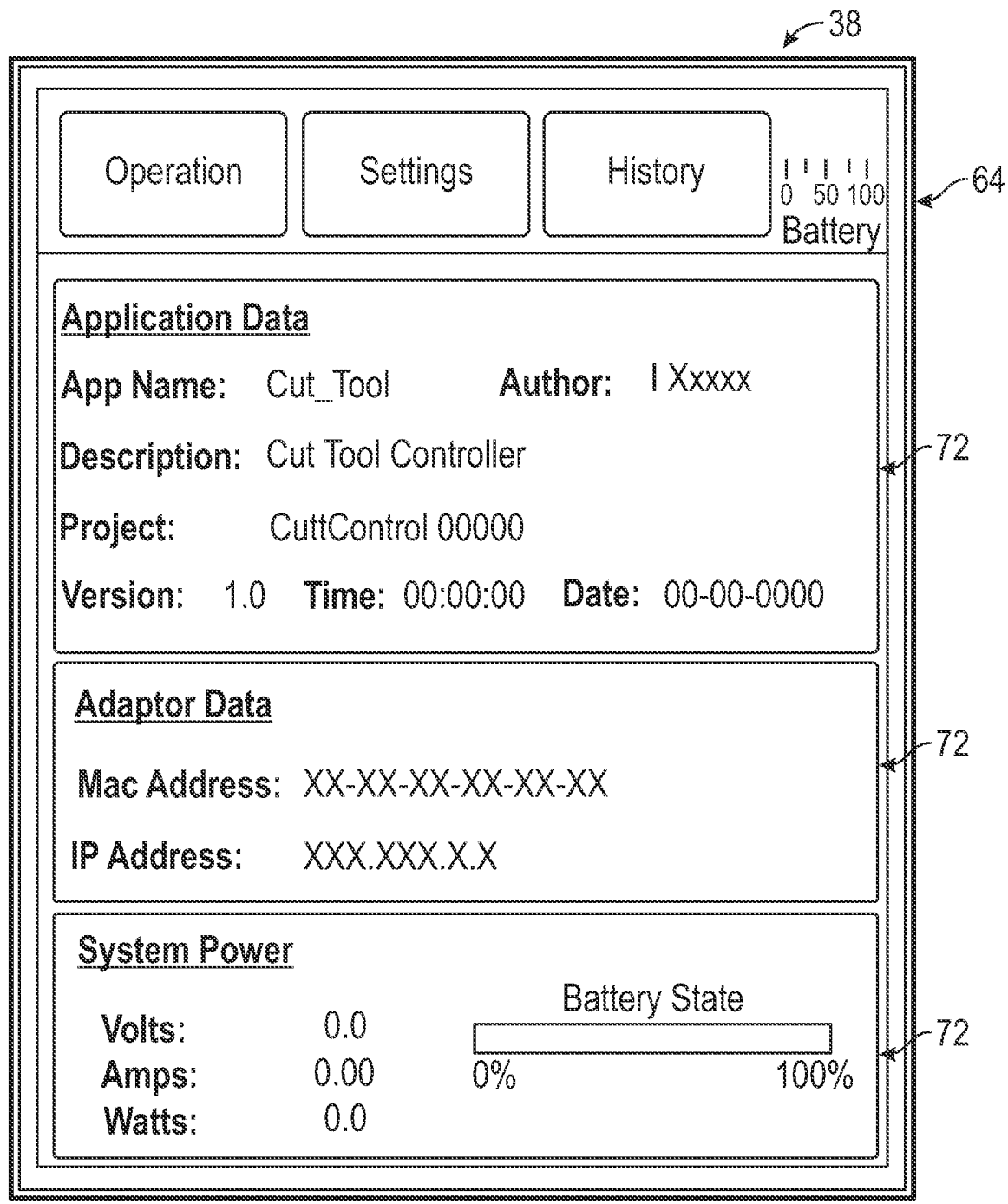
FIG. 7 is a schematic example of another screen of the graphical user interface in accordance with embodiments of the present disclosure.

In FIG. 6, a settings screen of the operator interface 38 is illustrated. The settings screen may be used to provide various data/information 70 to the operator. Examples of such information include gearbox ratio, metric/imperial units, stepper motor pulse/revolution data, distance traveled data, speed data, and/or other desired data. The operator interface 38 also may be used to provide a device information screen 72, as illustrated in FIG. 7. Such a screen may be used to provide wireless interface data, project data, system power data, specific application data, and/or other desired data that may be useful to an operator.

Figure 8:
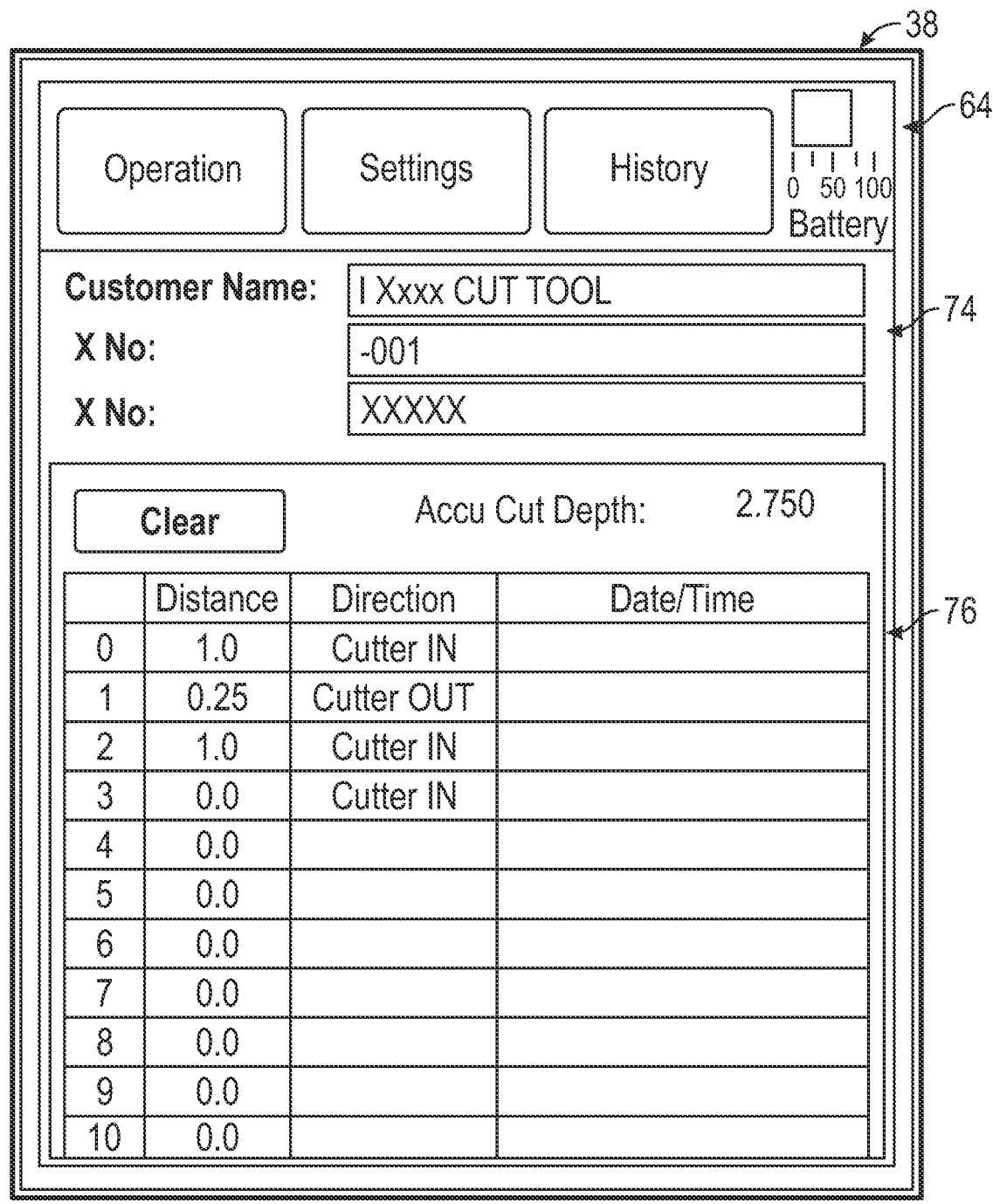
FIG. 8 is a schematic example of another screen of the graphical user interface in accordance with embodiments of the present disclosure.

In FIG. 8, another screen example of operator interface 38 is illustrated. In this example, the screen may be used to output customer data 74 and cutting history data 76. However, the operator interface 38 may be configured for enabling many types of command/instruction entry and for providing many types of data related to a given cutting operation or other operation.

Depending on the parameters of a machine operation, the configuration and use of overall wireless control system 20 may be adjusted. For example, the wireless control system may utilize various wireless interfaces for use between handheld device 36 and machine controller 32. Additionally, various types of machine controllers 32 may be utilized according to the type of machine being controlled and the desired control functionality. Similarly, the tool post assembly 44 and the cutting tool 48 (or other type of tool) may be constructed and selected according to a variety of machining operations. Regardless of the specifics of the operation, however, the wireless control system 20 enables an operator to remotely control a desired operation on object 45.

Although a few embodiments of the disclosure have been described in detail above, those of ordinary skill in the art will readily appreciate that many modifications are possible without materially departing from the teachings of this disclosure. For example, the pipe isolation device of the present disclosure may be modified by adding additional sealing heads to become a triple, or more, block and bleed apparatus. Accordingly, such modifications are intended to be included within the scope of this disclosure as defined in the claims. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A method for controlling a cutting operation, comprising:
   connecting a stepper motor to a tool post assembly via a gearbox;
   coupling a machine controller to the stepper motor;
   mounting the tool post assembly proximate an object to be machined such that a cutter post is movable along a desired axis during a cutting operation; and
   controlling the cutting operation by providing control instructions via a handheld control device placed in wireless communication with the machine controller.

2. The method as recited in claim 1, wherein controlling the cutting operation comprises controlling the cutting depth.

3. The method as recited in claim 1, wherein controlling the cutting operation comprises controlling the cutting depth during refacing of a flange.

4. The method as recited in claim 1, wherein mounting comprises mounting the tool post assembly directly to the object.

5. The method as recited in claim 1, further comprising mounting a cutting tool to the cutter post.

6. The method as recited in claim 5, wherein mounting the cutting tool comprises mounting a lathe proximate a flange for a flange refacing operation.

7. The method as recited in claim 1, wherein providing control instructions via the handheld control device comprises providing control instructions via a tablet computer device.

8. The method as recited in claim 1, wherein providing control instructions via the handheld control device comprises providing control instructions via a smart phone.

9. The method as recited in claim 1, wherein coupling comprises coupling the machine controller to the stepper motor via a connection lead.

10. A method, comprising:
   providing a tool post assembly with a cutter post to which a cutting tool may be mounted;
   coupling a motive unit to the tool post assembly to enable controlled movement of the cutter post;
   connecting a machine controller to the motive unit to control operation of the motive unit, and thus the cutter post, according to control commands provided by the machine controller; and
   transmitting control instructions to the machine controller wirelessly from a handheld control device to establish the control commands for a desired cutting operation.

11. The method as recited in claim 10, wherein coupling the motive unit comprises coupling a motor to the tool post assembly.

12. The method as recited in claim 10, wherein coupling the motive unit comprises coupling a motor to the tool post assembly via a gearbox.

13. The method as recited in claim 10, wherein coupling the motive unit comprises coupling a stepper motor to the tool post assembly.

14. The method as recited in claim 10, wherein transmitting comprises transmitting control instructions to the machine controller wirelessly via a smart phone.

15. The method as recited in claim 10, wherein transmitting comprises transmitting control instructions to the machine controller wirelessly via a tablet computer device.

16. The method as recited in claim 10, further comprising mounting the tool post assembly directly to an object to be machined; and performing a machining operation on the object according to the control instructions provided by the handheld control device.

17. A system, comprising:
   a machine controller;
   a motor coupled to the machine controller;
   a tool post assembly connected to and operated by the motor to move a cutter post along a desired axis during a cutting operation on an object mounted proximate the tool post assembly; and
   a handheld control device in wireless communication with the machine controller, the handheld control device providing control instructions to the machine controller so as to direct operation of the motor, and thus of the tool post assembly, during the cutting operation.

18. The system as recited in claim 17, further comprising a lathe mounted to the cutter post.

19. The system as recited in claim 17, wherein the handheld control device comprises a smart phone.

20. The system as recited in claim 17, wherein the tool post assembly comprises a plurality of cooperating components which move relative to each other to enable cutting along the desired axis.

* * * * *